US 11,483,796 B2

(12) United States Patent
Gupta et al.

(10) Patent No.: US 11,483,796 B2
(45) Date of Patent: Oct. 25, 2022

(54) SYSTEMS AND METHODS FOR DYNAMICALLY GENERATING A MOBILE SOFTWARE-DEFINED WIDE AREA NETWORK GATEWAY LOCATION FOR REMOTE USERS

(71) Applicant: Cisco Technology, Inc., San Jose, CA (US)

(72) Inventors: Anubhav Gupta, Fremont, CA (US); Hendrikus G. P. Bosch, Aalsmeer (NL); Vamsidhar Valluri, Santa Clara, CA (US); Stefan Olofsson, Dubai (AE)

(73) Assignee: CISCO TECHNOLOGY, INC., San Jose, CA (US)

( * ) Notice: Subject to any disclaimer, the term of this patent is extended or adjusted under 35 U.S.C. 154(b) by 154 days.

(21) Appl. No.: 16/694,509

(22) Filed: Nov. 25, 2019

(65) Prior Publication Data
US 2021/0160813 A1 May 27, 2021

(51) Int. Cl.
*H04W 64/00* (2009.01)
*H04L 61/2585* (2022.01)
*H04W 24/08* (2009.01)
*H04W 48/16* (2009.01)

(52) U.S. Cl.
CPC ....... *H04W 64/006* (2013.01); *H04L 61/2585* (2013.01); *H04W 24/08* (2013.01); *H04W 48/16* (2013.01)

(58) Field of Classification Search
CPC ... H04W 64/006; H04W 24/08; H04W 48/16; H04L 61/2585
See application file for complete search history.

(56) References Cited

U.S. PATENT DOCUMENTS

| 5,941,947 | A | * | 8/1999 | Brown | G06Q 99/00 709/225 |
| 9,800,433 | B2 | | 10/2017 | Duong et al. | |
| 9,917,840 | B2 | | 3/2018 | Hulse et al. | |
| 10,210,030 | B2 | | 2/2019 | Brin | |
| 2013/0305344 | A1 | | 11/2013 | Alicherry | |
| 2016/0036777 | A1 | | 2/2016 | Bartlett | |

(Continued)

OTHER PUBLICATIONS

International Search Report and Written Opinion for International Application No. PCT/US2020/060935, dated Jan. 29, 2021.

*Primary Examiner* — Brenda H Pham
(74) *Attorney, Agent, or Firm* — Baker Botts, LLP

(57) ABSTRACT

According to certain embodiments, a system comprises one or more processors and one or more computer-readable non-transitory storage media comprising instructions that, when executed by the one or more processors, cause one or more components of the system to perform operations comprising: receiving location data associated with a plurality of remote users accessing one or more existing remote access gateways that are located at one or more network locations; building a heatmap of user locations based at least in part on the received location data; and identifying, from the heatmap of user locations, at least one new network location in which to generate at least one new remote access gateway, or at least one existing network location in which to remove at least one of the existing remote access gateways.

17 Claims, 6 Drawing Sheets

(56) References Cited

U.S. PATENT DOCUMENTS

| | | | |
|---|---|---|---|
| 2016/0119206 A1* | 4/2016 | Ansamaa | H04L 43/08 |
| | | | 370/252 |
| 2016/0262190 A1* | 9/2016 | Bitar | H04W 76/12 |
| 2017/0155590 A1* | 6/2017 | Dillon | H04L 41/5025 |
| 2020/0213199 A1* | 7/2020 | Sethi | H04L 41/0889 |

* cited by examiner

SYSTEMS AND METHODS FOR DYNAMICALLY GENERATING A MOBILE SOFTWARE-DEFINED WIDE AREA NETWORK GATEWAY LOCATION FOR REMOTE USERS

TECHNICAL FIELD

The present disclosure generally relates to software-defined wide area networks (SD-WANs), and more specifically to systems and methods for dynamically generating a mobile SD-WAN gateway location for remote users.

BACKGROUND

As the global workforce grows increasingly mobile, remote users access internet- and intranet-based enterprise resources by way of software-defined wide area networks (SD-WAN). Deployed as a virtual overlay to an existing network topology, a SD-WAN uses software-defined concepts for distributing traffic across a wide area network. Under the conventional SD-WAN model, a remote user may connect to the network via a centralized remote access gateway hosted by the enterprise. The location of the centralized remote access gateway is generally based on the physical location of the enterprise. However, as the number of remote users and/or the distance between remote users and the centralized gateway increases, the conventional model presents inefficiencies in, e.g., speed, connectivity, traffic allocation, bandwidth availability, and overall system management.

DESCRIPTION OF EXAMPLE EMBODIMENTS

Overview

Figure 1:
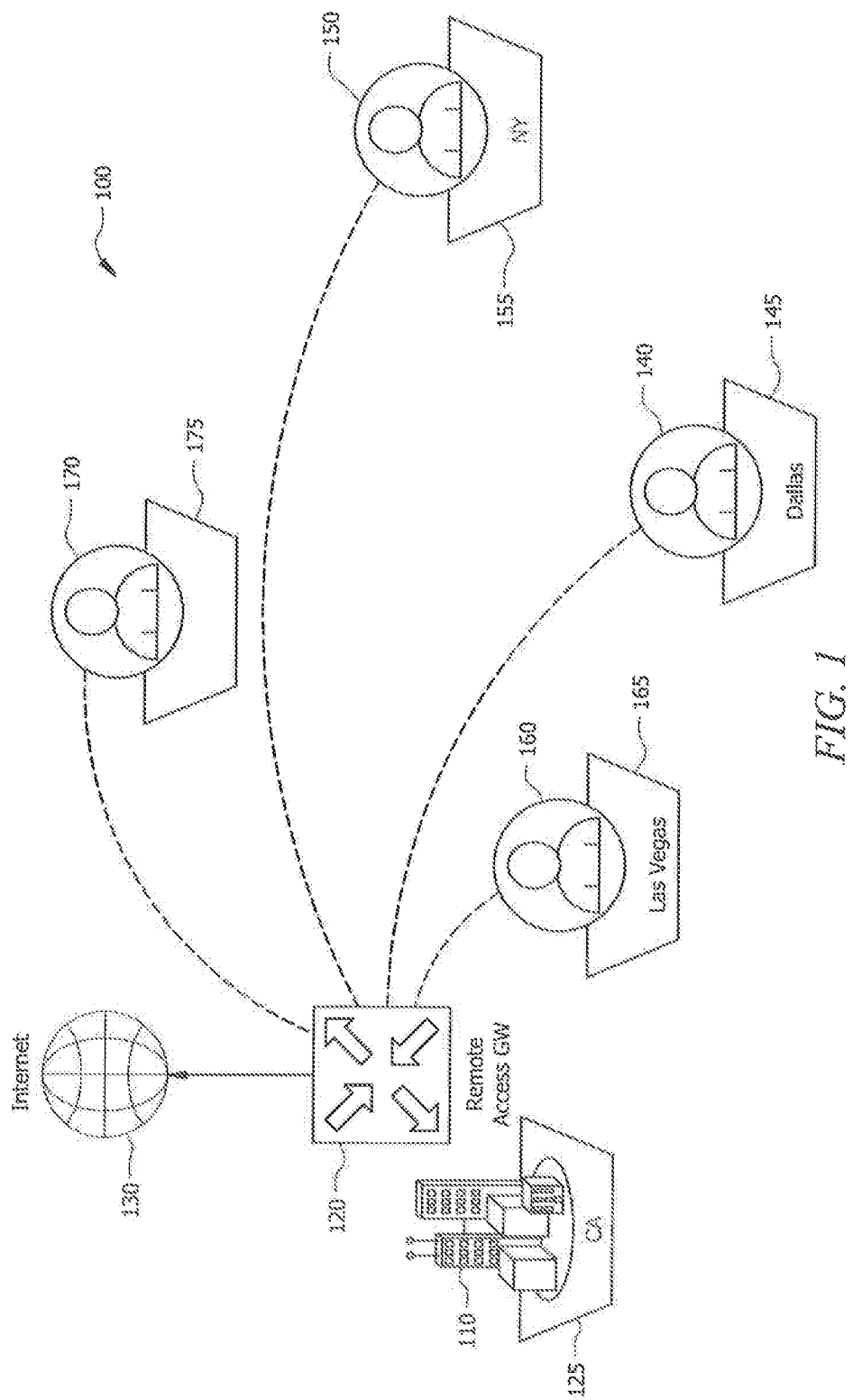
FIG. 1 illustrates a system for hosting a centralized remote access gateway for remote users.

According to an embodiment, a system may include one or more processors and one or more computer-readable non-transitory storage media comprising instructions that, when executed by the one or more processors, cause one or more components of the system to perform operations including, receiving location data associated with a plurality of remote users accessing one or more existing remote access gateways, wherein the one or more existing remote access gateways are located at one or more network locations; building a heatmap of user locations based at least in part on the received location data; and identifying, from the heatmap of user locations, at least one new network location in which to generate at least one new remote access gateway, or at least one existing network location from the one or more network locations in which to remove at least one existing remote access gateway from the one or more existing remote access gateways. The identifying step may further include determining, from the heatmap of user locations, a concentration of remote users at the at least one new network location, and if the concentration of the remote users at the at least one new network location exceeds a first pre-determined threshold, generating the at least one new remote access gateway at the at least one new network location. The identifying step may additionally include determining, from the heatmap of user locations, a concentration of remote users at the at least one existing network location; and if the concentration of the remote users at the at least one existing network location has fallen below a second pre-determined threshold, removing the at least one existing remote access gateway from the at least one existing network location.

Moreover, the location data may include Internet Protocol (IP) addresses associated with the plurality of remote users, wherein the IP addresses are translated via a geolocation database into the user locations for the building or updating of the heatmap.

Additionally, the at least one new new network location may be identified based on traffic generated by each remote user and a distance of the remote user from the one or more existing remote access gateways.

Furthermore, the one or more existing remote access gateways and the at least one new remote access gateway may be connected via a software-defined wide area network (SD-WAN) fabric. In accordance with an embodiment, the SD-WAN may operate as a service hosted by a provider, wherein the provider may include at least one of a cloud service provider, an enterprise provider, or a hybrid cloud-enterprise provider.

According to another embodiment, a method may include the steps of receiving location data associated with a plurality of remote users accessing one or more existing remote access gateways, wherein the one or more existing remote access gateways are located at one or more network locations; building a heatmap of user locations based at least in part on the received location data; and identifying, from the heatmap of user locations, at least one new network location in which to generate at least one new remote access gateway, or at least one existing network location from the one or more network locations in which to remove at least one existing remote access gateway from the one or more existing remote access gateways.

According to yet another embodiment, one or more computer-readable non-transitory storage media may embody instructions that, when executed by a processor, cause the performance of operations including receiving location data associated with a plurality of remote users accessing one or more existing remote access gateways, wherein the one or more existing remote access gateways are located at one or more network locations; building a heatmap of user locations based at least in part on the received location data; and identifying, from the heatmap of user locations, at least one new network location in which to generate at least one new remote access gateway, or at least one existing network location from the one or more network locations in which to remove at least one existing remote access gateway from the one or more existing remote access gateways.

Technical advantages of certain embodiments of this disclosure may include one or more of the following. The systems and methods described herein may use the location data of remote users to build a dynamic heatmap indicating the network locations of the remote users across the SD-WAN. Using the heatmap, if the system identifies a network location having a concentration of remote users and/or traffic that rises above a pre-determined threshold, it may "spin-up" a new remote access gateway at or near the identified network location. Likewise, if the system identifies a network location having a concentration of users and/or traffic that falls below a pre-determined threshold, it may initiate the "spinning-down" of a remote access gateway occurring at or near the identified network location. Because the heatmap is dynamic, the concentrations of remote users and/or traffic are continuously updated on the heatmap at regular intervals of time. The dynamic nature of heatmap and the ability of the system to spin up and spin down remote access gateways based on use may result in improved user experience for both internet- and intranet-bound user traffic in the network.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

FIG. 1 depicts a conventional system 100 for hosting a centralized remote access gateway for remote users. As shown in FIG. 1, an enterprise 110 located in California 125, for example, may have remote users located in various cities around the world. For example, FIG. 1 depicts remote users 140, 150, 160 in Dallas 145, New York 155, and Las Vegas 165, respectively. Additional remote users 170 may be located in other locations 175. In order to provide remote users 140, 150, 160, 170 access to internet- or intranet-based enterprise resources, the enterprise 110 may host a centralized remote access gateway 120 through which remote users 140, 150, 160, 170 may connect via the internet 130. Traditionally, these remote user connections were established though a virtual private network (VPN), wherein virtual point-to-point connections were created through dedicated circuits or tunneling protocols over existing networks. However, as an increasing amount of data and applications are stored and managed on the cloud, the SD-WAN provides a virtual interface, i.e., a virtual overlay to the physical network, to connect a series of endpoints, and in the case shown in FIG. 1, to connect remote users 140, 150, 160, 170 to enterprise- or cloud-based resources.

Notably, as depicted in FIG. 1, the centralized remote access gateway 120 may reside at a location corresponding to the physical or network location of the enterprise 110, which is often distinct from the network locations of remote users 140, 150, 160, 170. This may pose difficulties for both the remote user and the service provider. For example, when a remote mobile user connects to an SD-WAN centralized remote access gateway, he/she usually does so with a multi-band device. If the device is roaming in a remote location, it may connect in a foreign public land mobile network (PLMN) through Wi-Fi. Although local Wi-Fi access may find an attachment point that is closer to the interface, the traffic generated over the connection must first be routed to the home PLMN before it can enter a SD-WAN. Thus, a network location which may be beneficial for one interface may prove inefficient for another interface. Such inefficiencies may impact the speed, connectivity, and allocation of traffic resources within the network.

Figure 2:
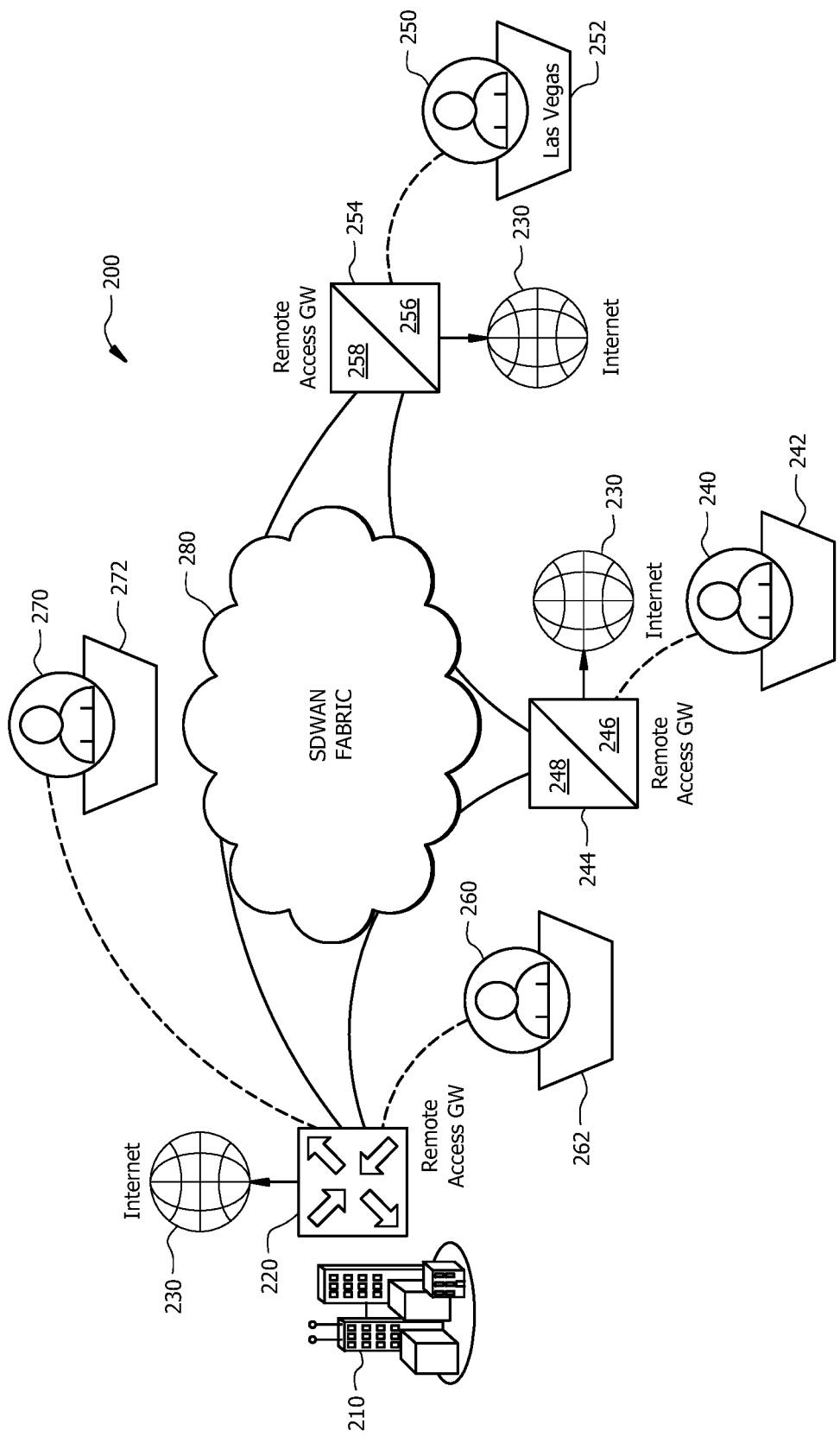
FIG. 2 illustrates a system for dynamically generating SD-WAN mobile remote access gateways for remote users, in accordance with the present disclosure.

Reference is now made to FIG. 2, wherein is shown a system 200 for dynamically generating SD-WAN mobile remote access gateways for remote users in a SD-WAN fabric, according the present disclosure. The system 200 includes an initial remote access gateway 220 hosted by an enterprise 210 and having a connection to the internet 230. The initial remote access gateway 220 may be centralized and/or associated with the geographic and/or network location of the enterprise 210. Remote users 240, 250, 260, 270 in various user network locations 242, 252, 262, 272 may access enterprise resources by connecting to the initial remote access gateway 220 through the SD-WAN. Although FIG. 2 depicts a single remote user 240, 250, 260, 270 in each of the user network locations 242, 252, 262, 272, it is to be understood that there may be one or more remote users in each of the one or more network locations who connect to the initial remote access gateway 220.

As remote users 240, 250, 260, 270 connect to the initial remote access gateway 220, a SD-WAN controller (not shown in FIG. 2) associated with the initial remote access gateway 220 may receive location data relating to each of the remote users 240, 250, 260, 270 and translate the data into corresponding user network locations 242, 252, 262, 272 of the remote users. In accordance with an embodiment, the translation of location data into corresponding user network locations may be accomplished as follows. The location data of a given remote user may comprise the Internet Protocol (IP) address associated with that remote user's device. This location data, received by the initial remote access gateway 220, may be transmitted to the SD-WAN controller. The SD-WAN controller may use any geolocation database (e.g., IPinfo, IPData, IPGeolocation, etc.) to translate the location data into the remote user's network location. Because the geolocation of an IP address is often based on the business address of the Internet Service Provider (ISP) to which the IP address has been assigned, the network location corresponding to the IP address may be different from the user's physical location.

Using the user network locations 242, 252, 262, 272 of the remote users 240, 250, 260, 270, the SD-WAN controller may then build a dynamic heatmap representing the concentrations of remote users 240, 250, 260, 270 at each of the user network locations 242, 252, 262, 272. In an embodiment, concentrations may be quantitative, representing, for example, a number of remote users, a percentage of total users, an amount of traffic generated by the users, bandwidth, latency, path length, or the like. In other embodiments, concentrations may be qualitative, depicting high, medium or low concentrations of remote users relative to other network locations. In yet further embodiments, concentrations may comprise a hybrid of quantitative and qualitative factors. The heatmap may comprise a visual depiction, a numerical representation, a graphical representation, and/or any other pictorial or analytical means, tool and/or device for representing locations of users in a network.

When the concentration of remote users 240 at a given network location 242, as represented in the heatmap, reaches or surpasses a pre-specified threshold, the SD-WAN controller may generate a new remote access gateway 244 at or near the given network location 242. For example, FIG. 2 depicts a first new remote access gateway 244 generated in association with a user network location 242, as well as a second new remote access gateway 254 generated in association with a separate user network location 252.

Each new remote access gateway 244, 254 may be interconnected with one another and with the initial remote access gateway through an SD-WAN fabric 280. The SD-WAN fabric may be dynamic. In other words, the SD-WAN fabric may extend (grow larger) as new remote access gateways are spun-up. Likewise, the SD-WAN fabric may contract (grow smaller) as existing remote access gateways are spun-down (as explained further below) in the system 200. Additionally, the SD-WAN may operate as a service hosted by a provider, wherein the provider may include a cloud service provider, an enterprise provider, and/or a hybrid cloud-enterprise provider.

In certain embodiments, generating a new remote access gateway 244, 254 may involve "spinning-up" a remote access gateway on a virtual machine (or orchestrator) running at the associated user network location 242, 252. For example, an SD-WAN controller may generate a new remote access gateway by instructing the virtual machine (or orchestrator) to spin-up the new remote access gateway at a user network location. Likewise, as explained below, the SD-WAN controller may remove an existing remote access gateway by instructing the virtual machine (or orchestrator) to spin-down the existing remote access gateway at a user network location. In certain embodiments, virtual SD-WAN routers may be spawned as remote access gateways.

In accordance with the present disclosure, the heatmap may be dynamic. Thus, as the concentrations of remote users in various user network locations change, the heatmap may be updated to reflect the new concentrations. In accordance with an embodiment, the heatmap may be dynamically updated based on concentrations of remote users who have connected to the initial remote access gateway 220 or one of the new remote access gateways 244, 254. In other words, as remote users connect to the initial and/or new remote access gateways, the system may continue to receive location data relating to the remote users and translate the data into corresponding user network locations of the remote users. Therefore, the dynamic heatmap may be built and/or updated based on the concentrations of remote users accessing the initial remote access gateway 220, as well as the new remote access gateways. Certain embodiments of the present disclosure may add a new remote access gateway (e.g., in network locations with a high concentration of remote users) or remove an existing remote access gateway (e.g., in network locations with a low concentration of remote users). An existing remote access gateway may generally refer to a remote access gateway that exists at the time of determining whether to add and/or remove a remote access gateway. Over the course of time, a "new" remote access gateway may become an "existing" remote access gateway, and additional (newer) remote access gateways can be generated as the remote users change network locations over time.

In an embodiment, the building of a heatmap may refer to creating a new heatmap and/or updating an existing heatmap. Thus, when the concentration of remote users at a user network location rises above a threshold level and is maintained at or above that level for a pre-determined period of time, the SD-WAN controller may generate (e.g., may initiate the spinning-up of) a new remote access gateway at or near that user network location. Likewise, when the concentration of remote users at a network location falls below a threshold level and is maintained at or below that level for a specified period of time, the SD-WAN controller may remove (e.g., may initiate the "spinning-down" of) the remote access gateway at or near that user network location. The spinning-down of a particular remote access gateway may include transferring remote users from the particular remote access gateway to the initial remote access gateway or to another existing remote access gateway, and thereafter deactivating the particular remote access gateway.

With continued reference to FIG. 2, each new remote access gateway 244, 254 may serve dual functions as: 1) a user-facing gateway 246, 256; and 2) a network-facing SD-WAN edge device 248, 258. As a user-facing gateway 246, 256, the new remote access gateway 244, 254 may serve as a point of entry for remote users to access enterprise and/or cloud resources and applications. As a network-facing edge device 248, 258 the new remote access gateway 244, 254 may satisfy SD-WAN functionality by enabling connectivity between networks and endpoints, and monitoring network path performance. Each remote access gateway 244, 254 may include any other functionality of an edge device. For example, in some embodiments, each remote access gateway 244, 254 may serve as a point of authentication and/or policy enforcement.

Additionally, in accordance with an embodiment of the present disclosure, the system 200 may also support multi-tenancy (not shown), wherein one or more remote access gateways may be generated based on the user network locations of remote users associated with other enterprises, i.e., separate from enterprise 210. The system 200 may spin-up and/or spin-down remote access gateways for remote users associated with these other enterprises in the manner generally described in conjunction with FIG. 2. The system may maintain elasticity and provide isolation functionality, whereby a remote access gateway spun-up for users of another enterprise may be precluded from interconnecting with other remote access gateways associated with enterprise 210.

Figure 3:
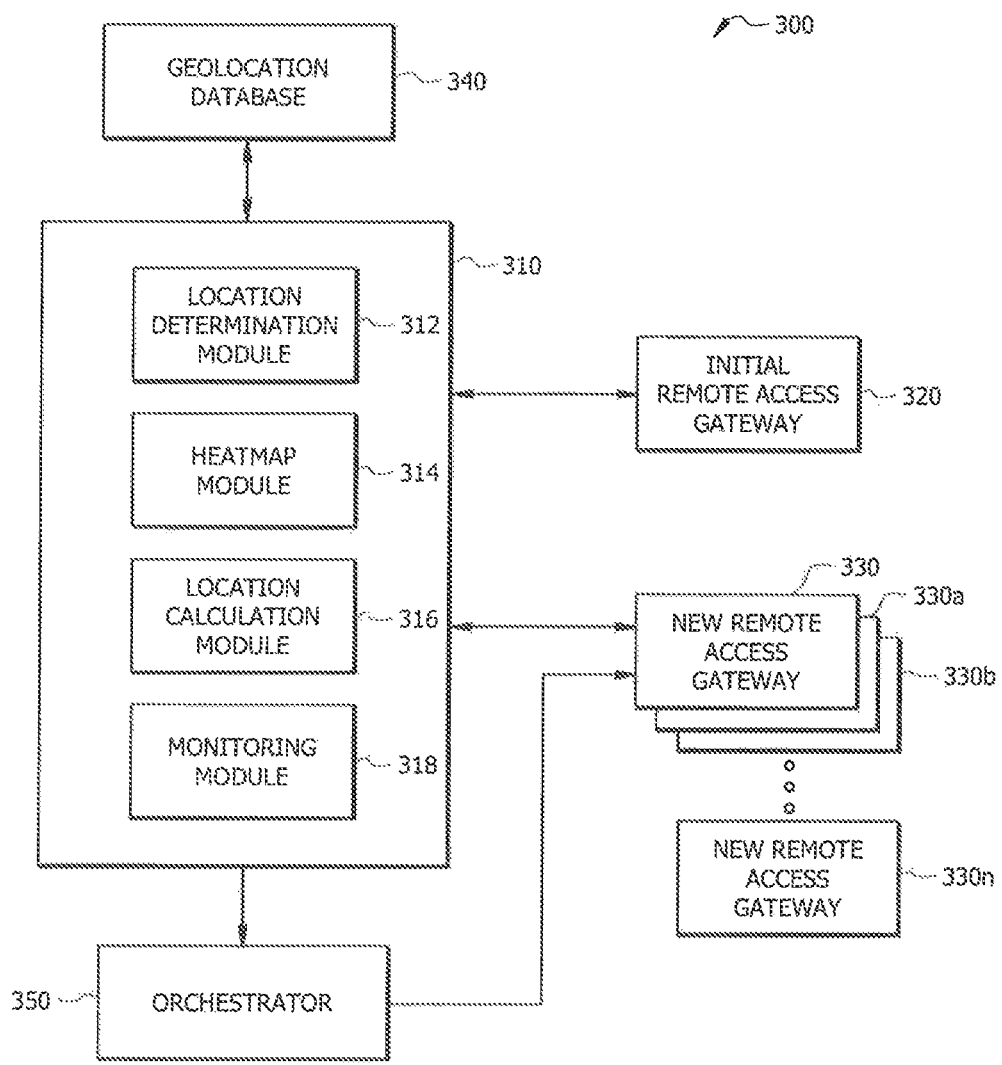
FIG. 3 illustrates a block diagram of system components for dynamically generating SD-WAN mobile remote access gateways for remote users, in accordance with the present disclosure.

Reference is now made to FIG. 3 wherein is shown a block diagram 300 of a controller 310, such as the SD-WAN controller described above with respect to FIG. 2, and associated components for dynamically generating SD-WAN mobile remote access gateways for remote users. The controller 310 may be deployed on-premises or on the cloud and may be communicatively coupled to one or more of the following components: an initial remote access gateway 320, one or more new remote access gateways 330*a-n*, a geolocation database 340, and an orchestrator 350. Controller 310 may comprise one or more of the following: a location determination module 312, heatmap building module 314, location calculation module 316, and a monitoring module 318. In operation, the controller 310 may receive location data, such as IP addresses, associated with a plurality of remote users from the initial remote access gateway 320. Using the geolocation database 340, the location determination module 312 of the controller 310 may determine and translate the location data received from the initial remote access gateway 320 into user network locations associated with the remote users. The heatmap module 314 may receive the translated user network locations and build (e.g., create and/or update), over a period of time, a heatmap which represents the concentrations of remote users at each of the user network locations.

As the heatmap is built (e.g., created and/or updated) by the controller, the data gathered and processed therein may be transmitted to the location calculation module 316. The location calculation module 316 may calculate and/or determine one or more new network locations to spin-up new remote access gateways by using a weighted clustering technique based on a partition clustering algorithm, which may be represented as:

Partition Algorithm Function (w[X], d, k)→Output a k clustering of X, wherein (w[X], d) denotes weighted data based on traffic generated by each remote user at a given user network location and the distance of the remote user from the remote access gateway he/she is currently connected to. After one or more new network locations have been calculated and/or determined by the location determination module 312, the controller 310 may instruct an orchestrator (or virtual machine) 350 to spin up one or more new remote access gateways at the determined new network locations.

With continued reference to FIG. 3, the controller 310 may continue to receive location data relating to remote users from the initial remote access gateway 320, as well as from one or more of the new remote access gateways 330. As noted above, the building of the heatmap may further comprise updating the heatmap at regular intervals to reflect changes in remote user concentrations at the various user network locations. A monitoring module 318 may continue to monitor changes in the heatmap. As the heatmap is updated by the heatmap module 314, the changes may be transmitted to the monitoring module 318. If the remote user concentration at a user network location falls below a pre-determined threshold and remains below that threshold for a pre-determined period of time, the monitoring module 318 may instruct the orchestrator (virtual machine) 350 to spin down a remote access gateway 330 associated with that user network location. Likewise, if the remote user concentration at a user network location rises above a pre-determined threshold and is maintained above that threshold for a pre-determined period of time, the monitoring module 318 may instruct the orchestrator (virtual machine) 350 to spin up a new remote access gateway 330 at or near the user network location. It is to be understood that the controller and associated components shown and described in conjunction with FIG. 3 may be adapted or modified without departing from the spirit of the present disclosure.

Figure 4:
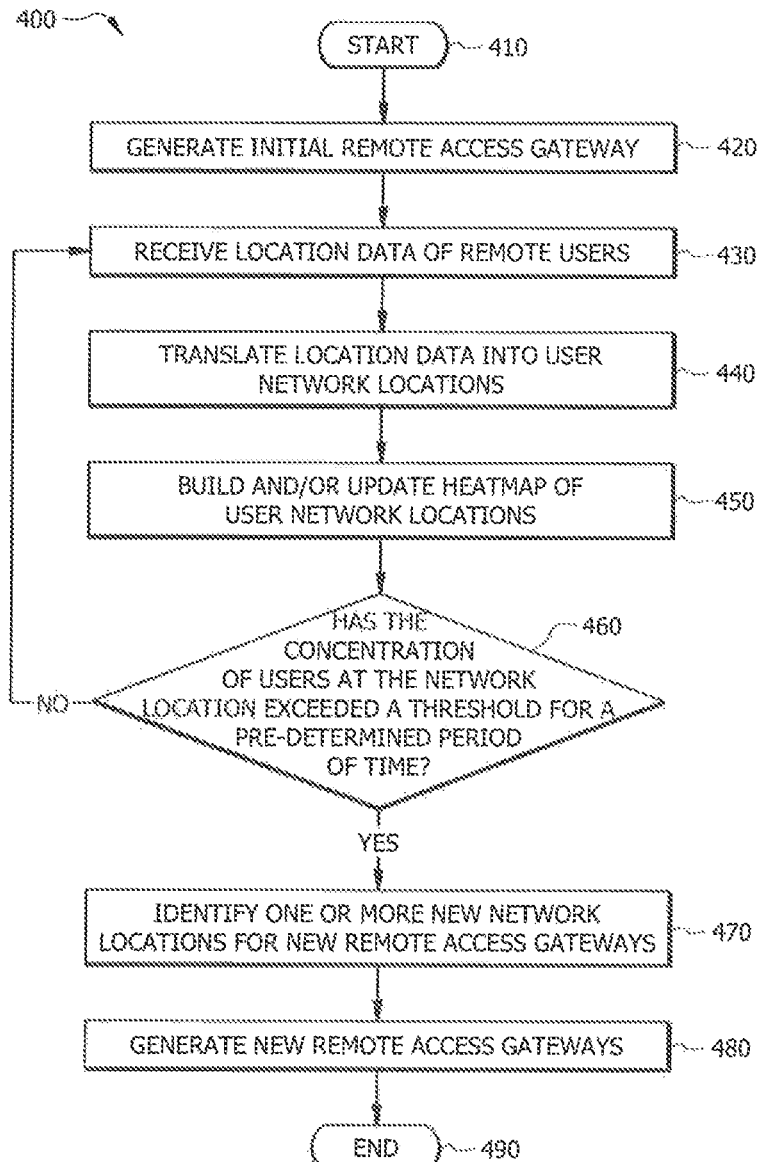
FIG. 4 illustrates an embodiment for a method for dynamically generating a mobile SD-WAN remote access gateway for remote users, in accordance with the present disclosure.

Reference is now made to FIG. 4, wherein is shown an embodiment of a method 400 for dynamically hosting SD-WAN remote access gateways for remote users. The method 400 may begin at step 410. At step 420, an initial remote access gateway may be generated at a first network location corresponding to the geophysical or network location of an enterprise. In an embodiment, the initial remote access gateway may refer to an initial (enterprise-hosted) remote access gateway (such as depicted as element 210 in FIG. 2) or another remote access gateway that may have been generated or spun-up at a network location (such as depicted as element 244 in FIG. 2). For purposes of clarity, a network may include one or more existing remote access gateways. An existing remote access gateway may generally refer to a remote access gateway that exists at the time of determining whether to add and/or remove a remote access gateway. The existing remote access gateways may include the initial remote access gateway and any "new" remote access gateway(s) that have been generated such that the "new" remote access gateways exist at the time of determining whether to add and/or remove a remote access gateway. Additional (newer) remote access gateways may be generated over the course of time. At step 430, location data associated with a plurality of remote users accessing the initial, new, or existing remote access gateway may be received. At step 440, the location data may be translated into user network locations via a geolocation database. At step 450, a heatmap of user network locations may be built (e.g., created and/or updated) based on concentrations of remote users at the user network locations. The building of the heatmap at step 450 may further comprise the updating of the heatmap at regular intervals to reflect changes in the concentrations of remote users at the various user network locations. At step 460, a determination may be made, based on the heatmap, as to whether the concentration of users at one or more user network locations has achieved or exceeded a threshold concentration for a pre-determined period of time.

If, at step 460, it is determined that the concentration of users at one or more user network locations has not achieved or exceeded a pre-determined threshold concentration for a pre-determined period of time, the method may return to step 430, wherein location data associated with remote users may continue to be received. If, at step 460, it is determined that the concentration of users at one or more user network locations has achieved or exceeded a pre-determined threshold concentration for a pre-determined period of time, the method may continue to step 470, wherein one or more new network locations (corresponding to a location at or near the one or more user network locations achieving the pre-determined threshold concentration) may be identified for the generation of one or more new remote access gateways. At step, 480, the one or more new remote access gateways may be generated at the one or more new network locations. At step 490, the method may end.

Figure 5:
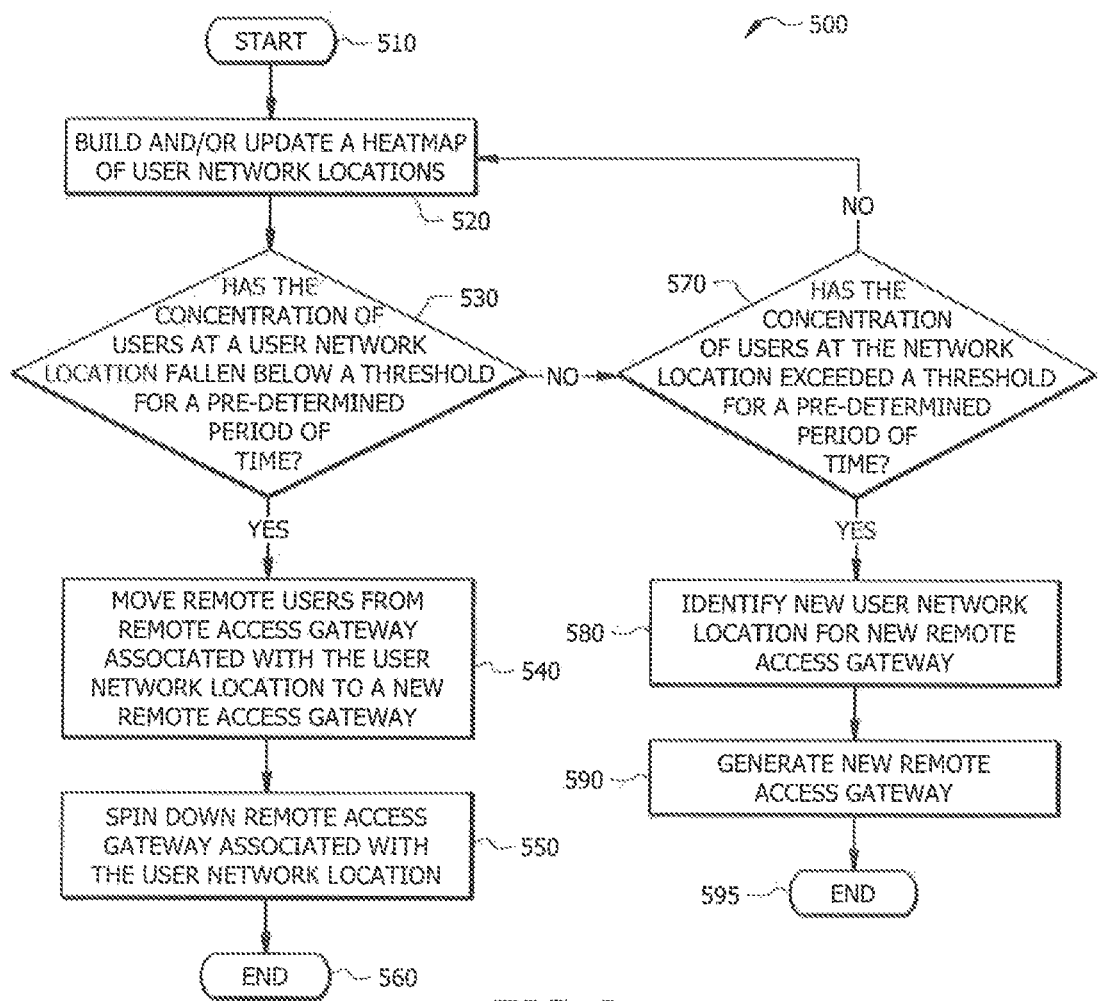
FIG. 5 illustrates an embodiment for a method for dynamically updating remote access gateways, in accordance with the present disclosure.

FIG. 5 illustrates another embodiment of a method 500 for dynamically updating SD-WAN remote access gateways according the present disclosure. The method 500 begins at step 510. At step 520 (corresponding to step 450 in FIG. 4), a heatmap of user network locations may be built (e.g., created and/or updated) based on concentrations of remote users at user network locations. The building of the heatmap may include the updating of the heatmap at pre-determined intervals of time based on changes in concentrations of remote users at the user network locations. For example, the heatmap may be updated at 5 minute intervals, 15 minute intervals, 30 minute intervals, or other suitable time intervals. At step 530, a determination may be made as to whether the concentration of remote users at one or more user network locations has fallen below a pre-determined threshold level for a pre-determined period of time. If, at step 530, it has been determined that the concentration of remote users at one or more user network locations has fallen below the pre-determined threshold level for a pre-determined period of time, the method may proceed to step 540, wherein remote users may be moved from the one or more remote access gateways at the identified one or more user network locations to one or more existing remote access gateways. At step 550, the one or more remote access gateways having the low concentration of users may be spun down. At step 560, the method may end.

If, at step 530, it has been determined that the concentration of remote users at one or more user network locations has not fallen below a pre-determined threshold level for a pre-determined period of time, the method may proceed to step 570, wherein a determination may be made as to whether the concentration of remote users at one or more network locations has exceeded a pre-determined threshold level for a pre-determined period of time. If, at step 570, it is determined that the concentration of remote users at one or more network locations has not exceeded a pre-determined threshold level for a pre-determined period of time, the method may return to step 520, wherein the heatmap may continue to be built (e.g., updated) at pre-determined intervals. As described in conjunction with FIG. 4, the heatmap may be built based on location data received from remote users, which is translated into user network locations of the remote users. If, at step 570, it is determined that the concentration of remote users at one or more network locations has exceeded the pre-determined threshold level for a pre-determined period of time, the method may proceed to step 580, wherein one or more new network locations (corresponding to locations at or near the one or more user network locations achieving the threshold concentration) may be identified for the generation of one or more new remote access gateways. At step 590, the one or more new remote access gateways may be generated at the one or more new network locations. At step 595, the method may end.

Figure 6:
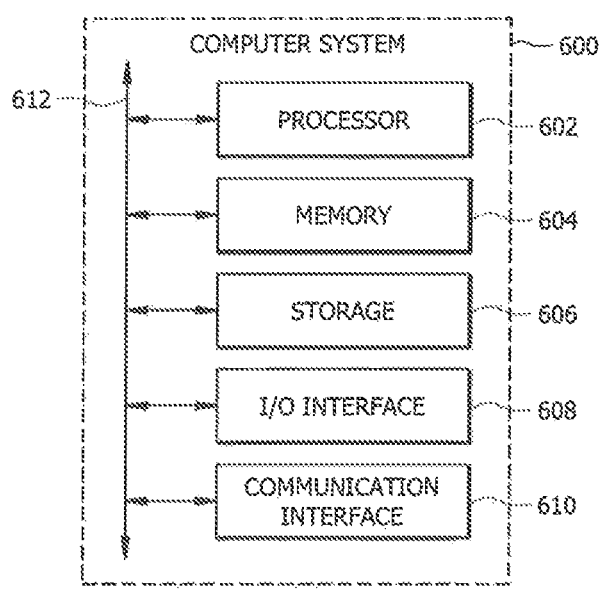
FIG. 6 illustrates a computer system, in accordance with the present disclosure.

Reference is now made to FIG. 6, wherein is shown an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 512 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. A system, comprising:
   one or more processors; and
   one or more computer-readable non-transitory storage media comprising instructions that, when executed by the one or more processors, cause one or more components of the system to perform operations comprising:
   receiving location data associated with a plurality of remote users accessing one or more existing remote access gateways, wherein the one or more existing remote access gateways are located at one or more network locations;
   building a heatmap of user locations based at least in part on the received location data, wherein the heatmap of user locations comprises different concentrations of remote users at different network locations;
   dynamically updating the different concentrations of remote users at the different network locations; and
   identifying, from the heatmap of user locations and independent of a gateway load level, at least one new network location in which to generate at least one new remote access gateway using a weighted clustering technique based on a partition clustering algorithm, wherein the partition clustering algorithm is based on traffic generated by each remote user from the plurality of remote users and a distance of the remote user from the one or more existing remote access gateways.

2. The system of claim 1, wherein the identifying step further comprises:
   determining, from the heatmap of user locations, a concentration of remote users at the at least one new network location; and
   in response to determining that the concentration of the remote users at the at least one new network location exceeds a first pre-determined threshold, generating the at least one new remote access gateway at the at least one new network location.

3. The system of claim 1, wherein the identifying step further comprises:
   determining, from the heatmap of user locations, a concentration of remote users at the at least one existing network location; and
   in response to determining that the concentration of the remote users at the at least one existing network location has fallen below a second pre-determined threshold, removing the at least one existing remote access gateway from the at least one existing network location.

4. The system of claim 1, wherein the location data comprises:
   Internet Protocol (IP) addresses associated with the plurality of remote users, wherein the IP addresses are translated via a geolocation database into the user locations for the building of the heatmap.

5. The system of claim 1, wherein the one or more existing remote access gateways and the at least one new remote access gateway are connected via a software-defined wide area network (SD-WAN) fabric.

6. The system of claim 5, wherein the SD-WAN operates as a service hosted by a provider, wherein the provider comprises at least one of a cloud service provider, an enterprise provider, or a hybrid cloud-enterprise provider.

7. A method comprising:
   receiving location data associated with a plurality of remote users accessing one or more existing remote access gateways, wherein the one or more existing remote access gateways are located at one or more network locations;
   building a heatmap of user locations based at least in part on the received location data, wherein the heatmap of user locations comprises different concentrations of remote users at different network locations;
   dynamically updating the different concentrations of remote users at the different network locations; and
   identifying, from the heatmap of user locations and independent of a gateway load level, at least one new network location in which to generate at least one new remote access gateway using a weighted clustering technique based on a partition clustering algorithm, wherein the partition clustering algorithm is based on traffic generated by each remote user from the plurality of remote users and a distance of the remote user from the one or more existing remote access gateways.

8. The method of claim 7, wherein the identifying step further comprises:
   determining, from the heatmap of user locations, a concentration of remote users at the at least one new network location; and
   in response to determining that the concentration of the remote users at the at least one new network location exceeds a first pre-determined threshold, generating the at least one new remote access gateway at the at least one new network location.

9. The method of claim 7, wherein the identifying step further comprises:
   determining, from the heatmap of user locations, a concentration of remote users at the at least one existing network location; and
   in response to determining that the concentration of the remote users at the at least one existing network location has fallen below a second pre-determined threshold, removing the at least one existing remote access gateway from the at least one existing network location.

10. The method of claim 7, wherein the location data comprises:
    Internet Protocol (IP) addresses associated with the plurality of remote users, wherein the IP addresses are translated via a geolocation database into the user locations for the building of the heatmap.

11. The method of claim 7, wherein the one or more existing remote access gateways and the at least one new remote access gateway are connected via a software-defined wide area network (SD-WAN) fabric.

12. The method of claim 11, wherein the SD-WAN operates as a service hosted by a provider, wherein the provider comprises at least one of a cloud service provider, an enterprise provider, or a hybrid cloud-enterprise provider.

13. One or more computer-readable non-transitory storage media embodying instructions that, when executed by a processor, cause the performance of operations comprising:
    receiving location data associated with a plurality of remote users accessing one or more existing remote access gateways, wherein the one or more existing remote access gateways are located at one or more network locations;
    building a heatmap of user locations based at least in part on the received location data, wherein the heatmap of user locations comprises different concentrations of remote users at different network locations;
    dynamically updating the different concentrations of remote users at the different network locations; and
    identifying, from the heatmap of user locations and independent of a gateway load level, at least one new network location in which to generate at least one new remote access gateway using a weighted clustering technique based on a partition clustering algorithm, wherein the partition clustering algorithm is based on traffic generated by each remote user from the plurality of remote users and a distance of the remote user from the one or more existing remote access gateways.

14. The one or more computer-readable non-transitory storage media of claim 13, wherein the identifying step further comprises:
    determining, from the heatmap of user locations, a concentration of remote users at the at least one new network location; and
    in response to determining that the concentration of the remote users at the at least one new network location exceeds a first pre-determined threshold, generating the at least one new remote access gateways at the at least one new network location.

15. The one or more computer-readable non-transitory storage media of claim 13, wherein the identifying step further comprises:
    determining, from the heatmap of user locations, a concentration of remote users at the at least one existing network location; and
    in response to determining that the concentration of the remote users at the at least one existing network location has fallen below a second pre-determined threshold, removing the at least one existing remote access gateway from the at least one existing network location.

16. The one or more computer-readable non-transitory storage media of claim 13, wherein the location data comprises:
    Internet Protocol (IP) addresses associated with the plurality of remote users, wherein the IP addresses are translated via a geolocation database into the user locations for the building of the heatmap.

17. The one or more computer-readable non-transitory storage media of claim 13, wherein the one or more existing remote access gateways and the at least one new remote access gateway are connected via a software-defined wide area network (SD-WAN) fabric, wherein the SD-WAN operates as a service hosted by a provider, and wherein the provider comprises at least one of a cloud service provider, an enterprise provider, or a hybrid cloud-enterprise provider.

* * * * *